United States Patent [19]

Hinzmann et al.

[11] Patent Number: 5,043,111

[45] Date of Patent: Aug. 27, 1991

[54] PROCESS AND APPARATUS FOR THE MANFUACTURE OF DIMENSIONALLY ACCURATE DIE-FORMED PARTS

[75] Inventors: Gerd Hinzmann, Brüggen; Norbert Nies, Neuss; Siegfried Radewahn, Mönchen-gladbach, all of Fed. Rep. of Germany

[73] Assignee: Mannesmann AG, Düsseldorf, Fed. Rep. of Germany

[21] Appl. No.: 537,568

[22] Filed: Jun. 14, 1990

[30] Foreign Application Priority Data

Jun. 15, 1989 [DE] Fed. Rep. of Germany ....... 3919821

[51] Int. Cl.[5] ........................ B29C 43/02; B29C 43/58

[52] U.S. Cl. .................................. 264/40.5; 264/109; 425/78; 425/149; 425/150

[58] Field of Search ..................... 264/40.1, 40.5, 109; 425/78, 149, 150

[56] References Cited

U.S. PATENT DOCUMENTS 4,270,890 6/1981 Ottl .................................... 425/150

*Primary Examiner*—Mary Lynn Theisen

*Attorney, Agent, or Firm*—Nils J. Ljungman & Associates

[57] ABSTRACT

A plurality of rams in a pressing machine are movable into and out of a predetermined position to compress power material and shape a die-formed part. The rams are advanced to a pre-selected spaced relationship to form a desired configuration of the die-formed part. Strain gauges are mounted on each ram to detect during the pressing operation elastic deformation, altering the dimension of the ram and the shape of the die-formed part. In response to detected elastic deformation, the strain gauges transmit a signal through a controller to a readout device for recording the magnitude of ram deformation. Thereafter, the press drive mechanism is actuated to move the rams to compensate for the change in dimension of the rams so that the rams are repositioned to maintain the desired spaced relationship for a predetermined configuration of the die-formed part.

20 Claims, 2 Drawing Sheets

PROCESS AND APPARATUS FOR THE MANFUACTURE OF DIMENSIONALLY ACCURATE DIE-FORMED PARTS

BACKGROUND OF THE INVENTION

1. Field of the Invention

The present invention relates to an apparatus and process for the manufacture of dimensionally accurate die-formed parts.

2. Background Information

U.S. Pat. No. 4,270,890 corresponding to German Patent No. 29 24 704 discloses a device for controlling the height of die-formed parts made from powder material by measuring the distances between the moving die parts and parts or elements fixed to the press frame. In this manner, the thickness of the pressings is measured and compared with the desired size to assume uniformity in dimension of the die formed parts. It is well known in die-forming of parts that the pressures generated create deformation in the press frame, altering the relative distances between the die parts. When the measuring elements are fixed to the press frame, then deformations of the press frame during the pressing will effect the readings produced by the measuring resulting in deviations in the desired height of the die-formed parts. In U.S. Pat. No. 4,270,890, it is disclosed that the measuring elements are fixed in relation to the press and, therefore, are not subject to the effects of any stretching of the press frame produced by high pressing forces.

The more stringent the requirements for precision geometry on a die-formed part, the smaller the tolerances. Consequently, any disruption caused by the elastic deformation of the pressure rams during the pressing process will effect the readings produced by the measuring and accuracy of the die-formed part. For simple die-formed parts (e.g. a cylindrical shape), this effect is insignificant, since the die tools are so rigidly constructed that no significant elastic deformations occur in the range of the pressing force encountered. On more complicated parts with several offsets, as utilized in multi-plate adaptor dies disclosed in German Patent No. 31 42 126 C2, the elastic deformation of the rams can not be ignored. Such die tools have a relatively thin-walled, long and slender shape and not a substantially rigid construction. This type of die tool configuration is subject to significant elastic deformation due to stretching of the press frame, under the action of the pressing force.

OBJECT OF THE INVENTION

An object of the invention is to provide a process and apparatus for improving the precision in the geometry of die-formed parts and, particularly, die-formed parts having offsets on several different levels.

SUMMARY OF THE INVENTION

In accordance with the present invention, there is provided a process for manufacturing die-formed parts by compressing powder material between pressing faces of rams of a press that includes the steps of positioning a powder material between oppositely positioned pressing faces of the rams. The rams are supported for longitudinal movement toward and away from each other. Pressure is applied to the rams to advance the rams to a preselected die-forming position where the pressing faces are positioned a preselected distance apart to achieve a desired configuration for the die-formed part. Each ram is monitored for a change in the shape in the ram due to elastic deformation incurred in the pressing operation. The position of the pressing face of each ram is compared with a predetermined position for desired configuration of the die-formed part after each pressing cycle. The pressure applied to each ram is adjusted in response to the detection of elastic deformation in the ram to advance the ram pressing face to a position required to achieve the desired configuration for the die-formed part.

In addition, the present invention is directed to apparatus for making die-formed parts from powder material that includes a press frame having a plurality of movable press components each having a pressing surface. A first press component and a second press component are supported in the press frame for movement toward and away from each other. Power means advances the first and second press components to a limit position spaced a preselected distance apart for compressing powder material positioned therebetween into a preselected configuration for a die-formed part. Means is provided for recording the relative distance between the pressing surfaces of the first and second press components in the limit position. Transducer means on the first and second press components detect elastic deformation in the press components. Controller means connected to the transducer means and the power means receives an input signal from the transducer means to detect elastic deformation and transmit an output signal to actuate the power means to advance the press components. The power means in response to the output signal advances a selected one of the press components a distance proportional to the magnitude of the elastic deformation to compensate for a change in the distance between the pressing components and form the die-formed part having the desired configuration.

Further, in accordance with the present invention there is provided a process for the manufacture of dimensionally accurate die-formed parts from powder compounds on a press in a die that includes a top ram and a bottom ram supported by components in the press. The position of the components supporting the rams is measured relative to a fixed point. The components supporting the rams are moved to a specified position in relationship to one another. The relative positions of the top and bottom rams in the press limit position are measured. The position of at least one of the rams is corrected by movement of the component supporting the ram in the pressing direction to a distance corresponding to a change in the dimension in the ram as a result of elastic deformation experienced by the ram.

The present invention, in overcoming the problem unresolved by the above-described prior art device, provides in a die-forming process a distance measurement system for determinating the position of a pressure ram installed in the immediate vicinity of the pressing surface of the ram. With this arrangement, measurements are taken at the pressing surface to provide a more accurate reading of the distance between the moving and fixed die parts than available when the measuring system is supported by the press frame which is subject to deformation. Consequently, elastic ram deformations do not effect the measuring system of the present invention. For structural reasons, however, it is generally impossible to fasten the distance measurement system in this manner.

In accordance with the present invention, the elastic deformation of the pressure rams are detected by direct or indirect measurement of the pressing force. The relative position of the opposite pressure ram in the pressing limit position is corrected as a function of the deformation values determined. The specified positions of the components supporting the rams, to which the moving parts of the length measurement system are fastened, are preliminary values. The values are based on the geometry of the die-formed part to be produced, taking into consideration the length of each individual ram. The specified positions of the components are corrected such as by moving the pressing surfaces of the top and bottom rams closer together or farther apart approximately by the amount of the stronger or weaker elastic deflection of the pressure rams caused by the pressing force. The correction values are calculated, for example, on the basis of the spring characteristic of the pressure rams as determined in preliminary tests and the pressing force measured during the pressing. It is not absolutely necessary to perform this correction for all rams. For example, on a multi-ram tool, the rams are relatively short and/or thick-walled and remain in their original specified position because the rams experience negligible elastic deformation. Consequently, only a ram with a less-rigid spring characteristic requires a correction in its relative specified position.

Another feature of the present invention includes production of die-formed parts in accordance with precise tolerances even when the die parts are subject to severe fluctuations in the pressing forces which generate elastic deformation of the pressure rams during the production, such fluctuations being caused, for example, by changes in the pressability of the powder used.

The invention is explained in greater detail below with reference to the simple embodiment illustrated in the accompanying drawings.

DESCRIPTION OF THE PREFERRED EMBODIMENT

Figure 1:
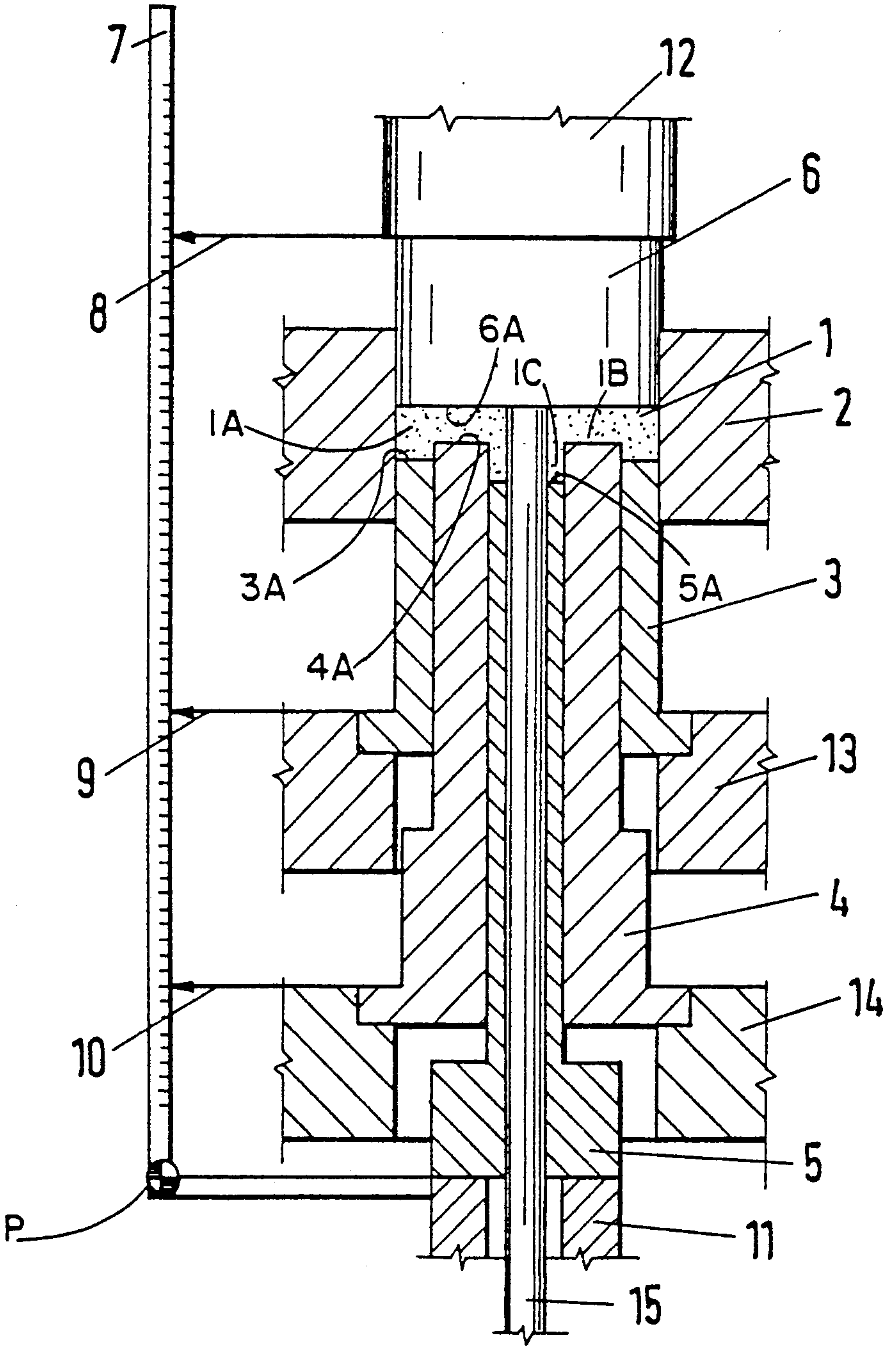
FIG. 1 is a fragmentary sectional view in side elevation of a press for making die-formed parts.
Figure 2:
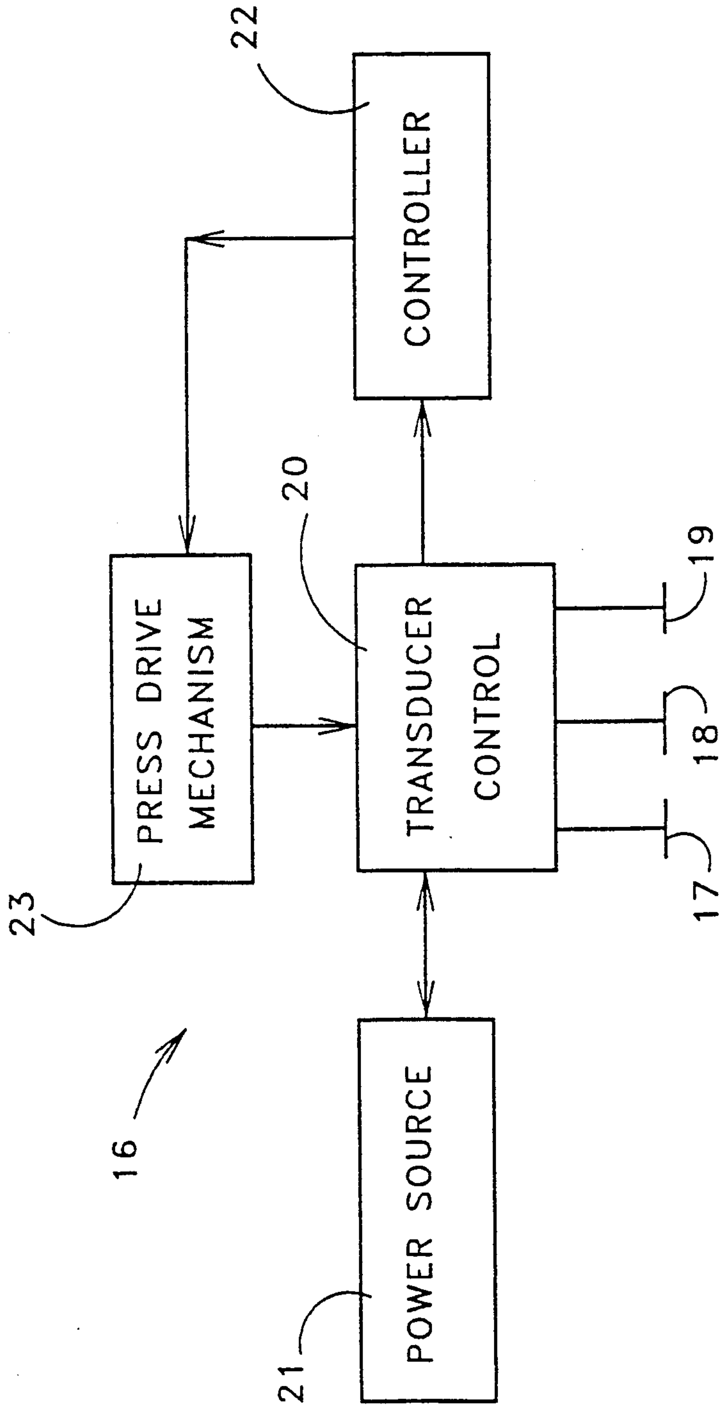
FIG. 2 is a diagrammatic illustration of an electronic control system for measuring deformation of the press parts and correcting the positions of the press parts in response to deformation.

Referring to the drawings and, particularly to FIGS. 1 and 2, there is illustrated a press tool of a press used in the manufacture of die-formed parts from steel powder, such as a ring-shaped, die-formed part 1. The die-formed part 1 is surrounded by a jacket-shaped die 2. The die-formed part 1, for example, has elevations 1A, 1B, and 1C as seen in cross-section in FIG. 1. The press includes a plurality of rams 3, 4, 5 corresponding to the elevations formed on the die-formed part 1. The rams 3, 4, 5 are independently movable relative to one another. The rams 3, 4, 5 are co-axially guided for movement toward and away from ram 6 which receives the powder material forming part 1. The surfaces of the rams 3, 4, 5 opposite the powder material are positioned at different elevations to form the stepped underside of the die-formed part 1. The opposite or smooth upper surface of the die-formed part 1 is formed by the top ram 6.

To achieve a precise geometry or configuration, the die-formed part 1, in the limit position of the press as shown in FIG. 1, the distances between the pressing surfaces 6A of ram 6 and the pressing surfaces 3A, 4A, 5A of rams 3, 4, 5 must be precisely set to form the corresponding elevations of the die-formed part having the preselected heights 1A, 1B, and 1C. The relative distances between the pressing surface 6A and pressing surfaces 3A, 4A, 5A are measured after each pressing operation or cycle. The relative positions of the rams 3, 4, 5, and 6 are indicated by a distance measurement system shown in FIG. 1. The measurement system includes a measuring grid 7 and indicators or reference points 8, 9, 10 which are movable on the grid 7 with respect to a fixed datum or zero point P. The measuring grid 7 is rigidly connected to the press component 11 which supports the press ram 5. The indicators 8, 9, 10 are connected to press components 12, 13, 14 which support ram 6 and rams 3 and 4, respectively of the press. The press components 12, 13, 14 advance and retract the support rams 6, 3, and 4 by operation of the press drive mechanism. The indicators 8, 9, 10 move with the rams 6, 3, 4.

The distances of the pressing surface 6A from the pressing surfaces 3A, 4A, and 5A are initially determined for the desired geometry of die part 1. Also the distances of the movable reference points 8, 9, and 10 from the pressing surfaces 6A, 3A, and 4A respectively are known. In addition, the distance of the ram pressing surface 5A from the datum point P is initially known for the desired die-part configuration. With this arrangement, the desired positions of the indicators 8, 9 and 10 from datum point P for a preselected configuration of die-part 1 as determined by the distances of ram pressing surfaces 3A, 4A, 5A from ram pressing surface 6A are selected.

The relative positions of the rams 3, 4, 5 to ram 6 set the elevations 1A, 1B, and 1C of the die-formed part 1 or configuration of the die-formed part 1. However, these measurements are only a preliminary indication of the relative positions of rams 3, 4, 5 and 6 prior to being subjected to elastic deformation as a result of the die-forming operation. While the rams 3, 4, 5 and 6 are rigid members, they possess spring characteristics resulting in elastic deformation of the rams as a result of the pressure forces applied thereto during the die-forming operation. Elastic deformation of the rams changes the relative positioning of the rams which in turn changes the configuration of the die-part. Consequently, the relative positioning of the rams must be continuously monitored. Adjustments must be made in the position of the rams to maintain uniformity in the shape of the die-part for each pressing cycle. The adjustments made are based on the recorded elastic deformation of the rams.

In one example of the present invention, as seen in FIG. 1, the ram 6 is relatively short in length with a substantial body mass. Consequently, ram 6 experiences little or no elastic deformation. On the other hand, rams 3, 4, 5 having an elongated body mass and comparatively thin walls are subject to the effects of elastic deformation. In particular, the ram 5 which surrounds a mandrel 15 is an elongated, thin-walled structure, making the ram 5 readily susceptible to elastic deformation.

The detection of elastic deformation, such as a change in length of the rams 3, 4, 5, is accomplished with the above-described measurement system and an electric control system 16 shown in FIG. 2. The control system 16 includes a plurality of force transducers 17, 18, 19 of a transducer control 20. Transducers 17, 18, 19 are connected to the rams 3, 4, 5 respectively as shown in FIG. 1. The transducers 17, 18, 19 are operable to detect displacement of the rams due to elastic deformation in response to the forces applied to the rams in the pressing operation. Force transducers suitable for use in the present invention, include piezoelectric sensors, strain gauges and the like.

Transducers or strain gauges 17, 18, 19 are electrically connected as illustrated in FIG. 2 through transducer control 20 to a power source 21 and a controller 22, such as a microprocessor. The controller 22 is, in turn, connected to a readout device 23 that provides a quantitative measurement of the change in the dimension, such as length, of each ram subjected to elastic deformation.

In operation, when the strain gauges 17, 18, or 19 record strain applied to the respective rams 3, 4, 5 resulting in elastic deformation of the ram during the pressing cycle, an output signal is transmitted to the transducer control 20. A responsive signal for the respective strain gauge/ram is supplied to controller 22. The controller 22 being programmed with the specification of each ram calculates in accordance with known formulas the amount of deformation corresponding to the strain gauge reading. This can also be accomplished by reference to tables that convert strain gauge readings to deformation measurements. Accordingly, controller 22 actuates readout device 23 to provide a numerical indication of the deformation for each strain gauge reading as a result of the elastic deformation experienced by each ram.

In one example, in the event the readout device 23 indicates a deformation of 0.25 mm for ram 3 in a pressing cycle. The press component 13 is advanced an additional increment of 0.25 mm as indicated by indicator 9 on measuring grid 7. Thus, the ram 3 is advanced from its initial position shown in FIG. 1 a distance of 0.25 mm toward ram 6. The ram advancement is accomplished by actuation of press component 13. Similar adjustments are made in the positioning of rams 4 and 5 based on the deformation amount recorded by the strain gauges 18 and 19, calculated by controller 22, and recorded by readout device 23.

It should be understood that in accordance with the present invention the electronic control 16 may be connected in an integrated circuit with the press components 12, 13, and 14 to automatically adjust the position of the rams in response to recorded deformation. A feedback circuit can be employed in the integrated circuit to continuously adjust the ram positions to achieve the desired configuration of the die-formed part.

Once the magnitude of deformation or change in length of rams 3, 4, 6 is determined, the press components associated with the rams are actuated to move the rams to a desired limit position where the powder material is compressed into the desired shape for forming the die-formed part 1 having a graduated surface structure. The rams 3, 4, and 5 are thus advanced to the required limit positions shown in FIG. 1 during each pressing cycle to form the part having the desired configuration which configuration is precisely repeated after each pressing operation by virtue of the process for monitoring ram elastic deformation and making the necessary adjustments in the positioning of the rams.

The predetermined or limit position of the rams to achieve the desired shape of the die-formed part 1 is shown in FIG. 1. The relative position of each ram must be precisely controlled to assure uniformity in the shape of the die-formed part after each pressing operation. However, elastic deformation in the rams as a result of the forces encountered in the pressing operation distorts the rams. The present invention overcomes the errors which would occur in the die-forming process if the ram elastic deformation were not taken into consideration.

With the present invention, distortion of the rams due to elastic deformation encountered during the pressing operation is detected by the individual transducers 17, 18, 19. Distortion of the rams alters the limit position of the rams pressing surface, i.e. the relative distances of the surfaces 3A, 4A, 5A from surface 6A differ from the desired distance. Each transducer 17, 18, 19 detects the strain associated with the elastic deformation which occurs in the ram. Based on the magnitude of the elastic deformation that occurs in any one of the rams 3, 4, 5, the press is actuated to adjust the pressure applied to the respective ram and change its relative position in the final or limit position. For example, elastic deformation of the rams 3, 4, 5 requires an advance of the ram pressing surfaces 3A, 4A, 5A to a new position as indicated by the measuring grid 7. The pressing surfaces 3A, 4A, 5A are advanced to a position relative to the pressing surface 6A to form the die part having a configuration corresponding exactly to the required configuration of the part as illustrated in FIG. 1 having elevations at a required height.

The force transducers 17, 18, 19 are responsive to elastic deformation experienced by each ram. Accordingly, each ram position is continuously monitored during each cycle of the pressing operation. Thus, in the even of elastic deformation occurring in any one of the rams, the relative position of the distorted ram to achieve the desired part shape is altered by the degree of the elastic deformation.

Generally, corrections required to be made to the relative positioning of the rams are made in the next successive pressing cycle. As a rule this provides satisfactory adjustment to the ram position to assure precise geometry of the die-formed part where a variation of the shape of the ram may be very slight. In this manner, minimal adjustments are made without requiring a substantial adjustment to be made from one pressing cycle to another. By constantly monitoring the effect of the pressing forces on the rams to compensate for elastic deformations a uniformity in the configuration of the die-formed part is obtained for each successive cycle.

In summary, one feature of the invention resides broadly in a process for the manufacture of dimensionally-accurate die-formed parts from powder compounds, in particular from metal compounds, on a press in a die, under the action of at least one bottom ram and one top ram, whereby the position of the components supporting the ram(s) and/or the die is measured relative to a fixed point, and the components supporting the ram are moved into a specified position in relation to one another which, taking the ram lengths into considerations, corresponds to the specified dimensions of the die-formed part in the pressing direction, characterized by the fact that in the press limit position, the specified position of at least one of the components supporting the rams is corrected in the pressing direction by an amount which corresponds to the elastic deformation of the ram or rams as a result of the action of the pressing force.

Another feature of the invention resides broadly in a process characterized by the fact that the pressing force is measured on at least one of the rams during the pressing cycle, and is used to calculate the corrected specified position in the same pressing cycle.

Yet another feature of the invention resides broadly in a press for the performance of the process with a die 2 with a least one top ram 6 and bottom rams 3, 4, 5 which can be moved relative to one another, with measurement equipment 7, 8, 9, 10 for the determination of the position of components 11, 12, 13, 14 supporting the rams 3, 4, 5, 6 which can be moved by force devices, and with an electronic regulation and control system connected to it to move the components 11, 12, 13, 14 supporting the ram 3, 4, 5, 6, and with at least one measurement apparatus connected to the electronic control for the direct or indirect measurement of the pressing force on at least one of the rams 3, 4, 5, 6, characterized by the fact that correction values for the elastic deformation of the ram or rams 3, 4, 5, 6 caused by the pressing force can be called up, or can be calculated on the basis of the spring characteristic of the ram 3, 4, 5, 6 in question.

A further feature of the invention resides broadly in a press characterized by the fact that the measurement apparatus is a piezoelectric sensor or a strain.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Process for manufacturing die-formed parts by compressing powder material between the pressing faces of rams comprising the steps of:
- positioning powder material between oppositely positioned pressing faces of rams;
- supporting the rams for longitudinal movement toward and away from each other;
- applying pressure to the rams to advance the rams to a preselected die-forming position where the pressing faces are positioned a preselected distance apart to achieve a desired configuration for the die-formed part;
- monitoring each ram for a change in the shape of the ram due to elastic deformation incurred in the pressing operation;
- comparing the position of the pressing face of each ram with the preselected die-forming position for the desired configuration of the die-formed part after each pressing cycle; and
- adjusting the pressure applied to each ram in response to detection of elastic deformation in the rams for positioning the ram pressing face to achieve the desired configuration for the die-formed part.

2. The process as set forth in claim 1, further including:
- connecting the rams to press components supported for longitudinal movement to advance the rams; and
- measuring the position of the press components relative to one another in the die-forming position to determine the required distance between the respective rams for the desired configuration of the die-formed part.

3. The process as set forth in claim 1, further including;
- positioning a force transducer on each ram to detect a change in a dimension of the ram due to elastic deformation of the ram.

4. The process as set forth in claim 1, further including;
- advancing the ram a preselected distance in response to the elastic deformation detected in the ram to maintain a desired dimension between the opposite rams.

5. The process as set forth in claim 1, further including;
- maintaining a first ram in position for receiving the powder material;
- positioning a plurality of the rams at desired distances oppositely of the first ram to form a die-formed part having selected elevations; and
- adjusting the position of the plurality of rams relative to the first ram to maintain the desired distances from the first ram in response to elastic deformation in any one of the rams.

6. The process as set forth in claim 1, further including;
- measuring the position of each ram with respect to a grid having a fixed reference point; and
- determining a change in the distance between the rams with respect to the grid in response to elastic deformation of the ram.

7. The process as set forth in claim 1, further including;
- comparing the position of the pressing face of each ram with respect to a reference grid supported relative to the rams; and
- adjusting the position of each ram after a pressing cycle to locate the pressing faces in the predetermined positions for a desired configuration of the die-formed part.

8. The process as set forth in claim 1, further including;
- positioning a strain gauge on each ram; and
- detecting by the strain gauge a change in the dimension of the ram due to elastic deformation of the ram.

9. The process as set forth in claim 8, further including;
- connecting the strain gauge on each ram to a controller; and
- connecting the controller to a readout device for numerically indicating the adjustment required in the position of a selected ram in response to detection of elastic deformation in the ram by the strain gauge.

10. Apparatus for making die-formed parts from powder material comprising:
- a press frame including a plurality of movable press components each having a pressing surface;

a first press component and a second press component;

said first and second press components supported in said press frame for movement toward and away from each other;

power means for advancing said first and second press components to a limit position spaced a preselected distance apart for compressing powder material positioned therebetween into a preselected configuration for a die-formed part;

means for recording the relative distance between said pressing surfaces of said first and second press components in the limit position;

transducer means on said first and second press components for detecting elastic deformation in said press components;

controller means connected to said transducer means and said power means for receiving an input signal from said transducer means in response to detected elastic deformation and transmitting an output signal to actuate said power means to advance a selected one of said press components; and said power means in response to said output signal advancing selected one of said press components a distance proportional to the magnitude of the elastic deformation to compensate for change in the distance between the press components and form the die-shaped part having the desired configuration.

11. Apparatus as set forth in claim 10, further including;

means positioned on each one of said pressing surfaces for independently detecting a change in the relative position of the pressing surface from the position required to form the preselected configuration of the die-formed part.

12. Apparatus as set forth in claim 10, further including;

said transducer means positioned on each of said press components; and said press components being independently movable in response to elastic deformation detected by said transducer means to advance a pressing surface a preselected distance corresponding to a change in the dimension of said press component.

13. Apparatus as set forth in claim 12, further including;

said transducer means including a strain gauge secured to each press component.

14. Apparatus as set forth in claim 10, further including;

a measuring grid fixed adjacent said movable press components;

indicator means connected to each movable press components for locating the relative position of said pressing surface on said measuring grid; and said power means being operable to advance said pressure components to a predetermined position with respect to said measuring grid maintaining a desired configuration of the die-formed part.

15. Apparatus as set forth in claim 10, further including;

said press components being positioned at selected elevations and distances apart for forming a die-formed part having preselected elevations; and said transducer means being positioned for movement with said press components.

16. Process for the manufacture of dimensionally-accurate die-formed parts from powder compounds on a press in a die comprising the steps of:

supporting a top ram and a bottom ram on the press for movement toward and away from each other;

measuring the position of the rams relative to a fixed point;

advancing the rams to a specified position for forming a die-formed part having dimensions corresponding to the position of the rams;

detecting elastic deformation experienced by the rams during the pressing operation; and positioning the rams in response to the detected elastic deformation of the rams to maintain a desired configuration for the die-formed part.

17. The process as set forth in claim 16, further including;

measuring the pressing force exerted on one of the rams during the pressing operation; and determining the specified position of the rams during each successive cycle of operation of the ram.

18. The process as set forth in claim 16, further including;

positioning one ram a preselected distance above another for movement relative to one another;

positioning measuring equipment for movement with the rams to determine the relative position of the rams; and applying a force to the rams to move the rams to a preselected position with respect to one another.

19. The process as set forth in claim 18, further including;

connecting a measuring device to any one of the rams for detecting the magnitude of the pressing force applied to the ram;

detecting elastic deformation of any one of the rams in response to the pressing force applied to the rams; and advancing one of the rams during the die-forming process a distance equal to the change in dimension of the ram due to elastic deformation.

20. The process as set forth in claim 18, further including;

measuring the relative position of each of the rams by a sensor to detect a change in the dimension in the ram due to elastic deformation.

* * * * *